(12) United States Patent
Rofougaran

(10) Patent No.: US 7,877,070 B2
(45) Date of Patent: Jan. 25, 2011

(54) METHOD AND SYSTEM FOR TUNING AN ANTENNA USING INJECTION

(75) Inventor: Ahmadreza Rofougaran, Newport Coast, CA (US)

(73) Assignee: Broadcom Corp.

( * ) Notice: Subject to any disclaimer, the term of this patent is extended or adjusted under 35 U.S.C. 154(b) by 1020 days.

(21) Appl. No.: 11/536,679

(22) Filed: Sep. 29, 2006

(65) Prior Publication Data

US 2008/0092192 A1    Apr. 17, 2008

(51) Int. Cl.
H04B 1/16    (2006.01)
(52) U.S. Cl. ............... 455/193.1; 455/196.1; 455/198.1
(58) Field of Classification Search ............. 455/193.1, 455/196.1, 198.1, 192.1, 77, 130, 134–135, 455/150.1, 151.3, 178.1, 182.3, 184.1, 191.1, 455/194.1, 226.1, 226.2, 232.1, 237.1, 255, 455/257–259, 277.2, 316, 340
See application file for complete search history.

(56) References Cited

U.S. PATENT DOCUMENTS

| | | | |
|---|---|---|---|
| 2005/0266811 A1 | 12/2005 | Weiss | |
| 2007/0207759 A1* | 9/2007 | Vavelidis et al. | 455/232.1 |
| 2008/0204148 A1* | 8/2008 | Kim et al. | 330/306 |
| 2009/0116586 A1* | 5/2009 | Arambepola et al. | 375/324 |

FOREIGN PATENT DOCUMENTS

| | | |
|---|---|---|
| KR | 20010078104 | 8/2001 |
| KR | 20030006051 | 1/2003 |
| WO | WO 2006/029082 | 3/2006 |

OTHER PUBLICATIONS

European Search Report for European Patent Application Serial No. 07007616.1-2215, dated May 19, 2009.

* cited by examiner

*Primary Examiner*—Pablo N Tran
(74) *Attorney, Agent, or Firm*—McAndrews, Held & Malloy, Ltd.

(57) ABSTRACT

Certain aspects of a method and system for tuning an antenna using injection may include mixing a received DVB-H signal with a reference oscillator signal to generate an added DVB-H signal. A mixed signal may be generated from the added DVB-H signal using the reference oscillator signal. A wireless antenna that receives the received DVB-H signal may be tuned based on a received signal strength indicator (RSSI) associated with the mixed signal. The reference oscillator signal may be generated and then may be amplified. The first mixed DVB-H signal may be amplified prior to the generating of the mixed signal. The RSSI associated with the mixed signal may be determined. The tuning may occur during receiving of a preamble of a packet for the received DVB-H signal and/or during receiving of a plurality of packets for the received DVB-H signal.

22 Claims, 6 Drawing Sheets

METHOD AND SYSTEM FOR TUNING AN ANTENNA USING INJECTION

CROSS-REFERENCE TO RELATED APPLICATIONS/INCORPORATION BY REFERENCE

This application also makes reference to:
U.S. application Ser. No. 11/536,678, filed Sep. 29, 2006;
U.S. application Ser. No. 11/536,682, filed Sep. 29, 2006;
U.S. application Ser. No. 11/536,650, filed Sep. 29, 2006;
U.S. application Ser. No. 11/536,644, filed Sep. 29, 2006;
U.S. application Ser. No. 11/536,676, filed Sep. 29, 2006;
U.S. application Ser. No. 11/536,659, filed Sep. 29, 2006;
U.S. application Ser. No. 11/536,673, filed Sep. 29, 2006;
U.S. application Ser. No. 11/536,670, filed Sep. 29, 2006;
U.S. application Ser. No. 11/536,672, filed Sep. 29, 2006;
U.S. application Ser. No. 11/536,648, filed Sep. 29, 2006;
U.S. application Ser. No. 11/536,669, filed Sep. 29, 2006;
U.S. application Ser. No. 11/536,666, filed Sep. 29, 2006;
U.S. application Ser. No. 11/536,675, filed Sep. 29, 2006;
U.S. application Ser. No. 11/536,685, filed Sep. 29, 2006;
U.S. application Ser. No. 11/536,645, filed Sep. 29, 2006;
U.S. application Ser. No. 11/536,655, filed Sep. 29, 2006;
U.S. application Ser. No. 11/536,660, filed Sep. 29, 2006;
U.S. application Ser. No. 11/536,657, filed Sep. 29, 2006;
U.S. application Ser. No. 11/536,662, filed Sep. 29, 2006;
U.S. application Ser. No. 11/536,688, filed Sep. 29, 2006;
U.S. application Ser. No. 11/536,667, filed Sep. 29, 2006;
U.S. application Ser. No. 11/536,651, filed Sep. 29, 2006;
U.S. application Ser. No. 11/536,656, filed Sep. 29, 2006;
U.S. application Ser. No. 11/536,663, filed Sep. 29, 2006;
The above stated applications are hereby incorporated herein by reference in their entirety.

FIELD OF THE INVENTION

Certain embodiments of the invention relate to processing of signals in a wireless communication system. More specifically, certain embodiments of the invention relate to a method and system for tuning an antenna using injection.

BACKGROUND OF THE INVENTION

Present developments in wireless technology may adapt broadcasting to mobility services. One limitation has been that broadcasting may often require high bit rate data transmission at rates higher than could be supported by existing mobile communications networks. However, with emerging developments in wireless communications technology, even this obstacle may be overcome. Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations.

Even among countries adopting a common DTTB system, variations may exist in parameters adapted in a specific national implementation. For example, DVB-T not only supports a plurality of modulation schemes, comprising quadrature phase shift keying (QPSK), 16-QAM, and 64 level QAM (64-QAM), but DVB-T offers a plurality of choices for the number of modulation carriers to be used in the COFDM scheme. The "2K" mode permits 1,705 carrier frequencies that may carry symbols, each with a useful duration of 224 μs for an 8 MHz channel. In the "8K" mode there are 6,817 carrier frequencies, each with useful symbol duration of 896 μs for an 8 MHz channel. In SFN implementations, the 2K mode may provide comparatively higher data rates but smaller geographical coverage areas than may be the case with the 8K mode. Different countries adopting the same system may also employ different channel separation schemes.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area SFN. There are also significant challenges in deploying broadcast services to mobile user equipment. Many handheld portable devices, for example, may require that services consume minimum power to extend battery life to a level, which may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H).

To meet requirements for mobile broadcasting the DVB-H specification may support time slicing to reduce power consumption at the user equipment, addition of a 4K mode to enable network operators to make tradeoffs between the advantages of the 2K mode and those of the 8K mode, and an additional level of forward error correction on multi-protocol encapsulated data-forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM), which may be more resilient to transmission errors. MPEG audio and video services may be more resilient to error than data, thus additional forward error correction may not be required to meet DTTB service objectives.

The MPE-FEC may comprise Reed-Solomon coding of IP data packets, or packets using other data protocols. The 4K mode in DVB-H may utilize 3,409 carriers, each with a useful duration of 448 μs for an 8 MHz channel. The 4K mode may enable network operators to realize greater flexibility in network design at minimum additional cost. Importantly, DVB-T and DVB-H may coexist in the same geographical area. Transmission parameter signaling (TPS) bits that are carried in the header of transmitted messages may indicate whether a given DVB transmission is DVB-T or DVB-H, in addition to indicating whether DVB-H specific features, such as time slicing, or MPE-FEC are to be performed at the receiver. As time slicing may be a mandatory feature of DVB-H, an indication of time slicing in the TPS may indicate that the received information is from a DVB-H service.

Time slicing, as used by DVB-H, may reduce power consumption in user equipment by increasing the burstiness of data transmission. Instead of transmitting data at the received rate, under time slicing techniques, the transmitter may delay the sending of data to user equipment and send data later but at a higher bit rate. This may reduce total data transmission time over the air, time, which may be used to temporarily power down the receiver at the user equipment. Time slicing may also facilitate service handovers as user equipment moves from one cell to another because the delay time imposed by time slicing may be used to monitor transmitters in neighboring cells. The increased burstiness of DVB-H data transmissions, however, may result in an increase of the processing data error rate since the DVB-H receiver has to process the received DVB-H packets in a substantially reduced time.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for tuning an antenna using injection, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects of a method and system for tuning an antenna using injection may comprise adding a received DVB-H signal with a reference oscillator signal to generate an added DVB-H signal. A mixed signal may be generated from the added DVB-H signal using the reference oscillator signal. A wireless antenna that receives the received DVB-H signal may be tuned based on a received signal strength indicator (RSSI) associated with the mixed signal. The reference oscillator signal may be generated and then may be amplified. The added DVB-H signal may be amplified prior to the generating of the mixed signal. The RSSI associated with the mixed signal may be determined. The tuning may occur during receiving of a preamble of a packet for the received DVB-H signal and/or during receiving of a plurality of packets for the received DVB-H signal.

Figure 1A:
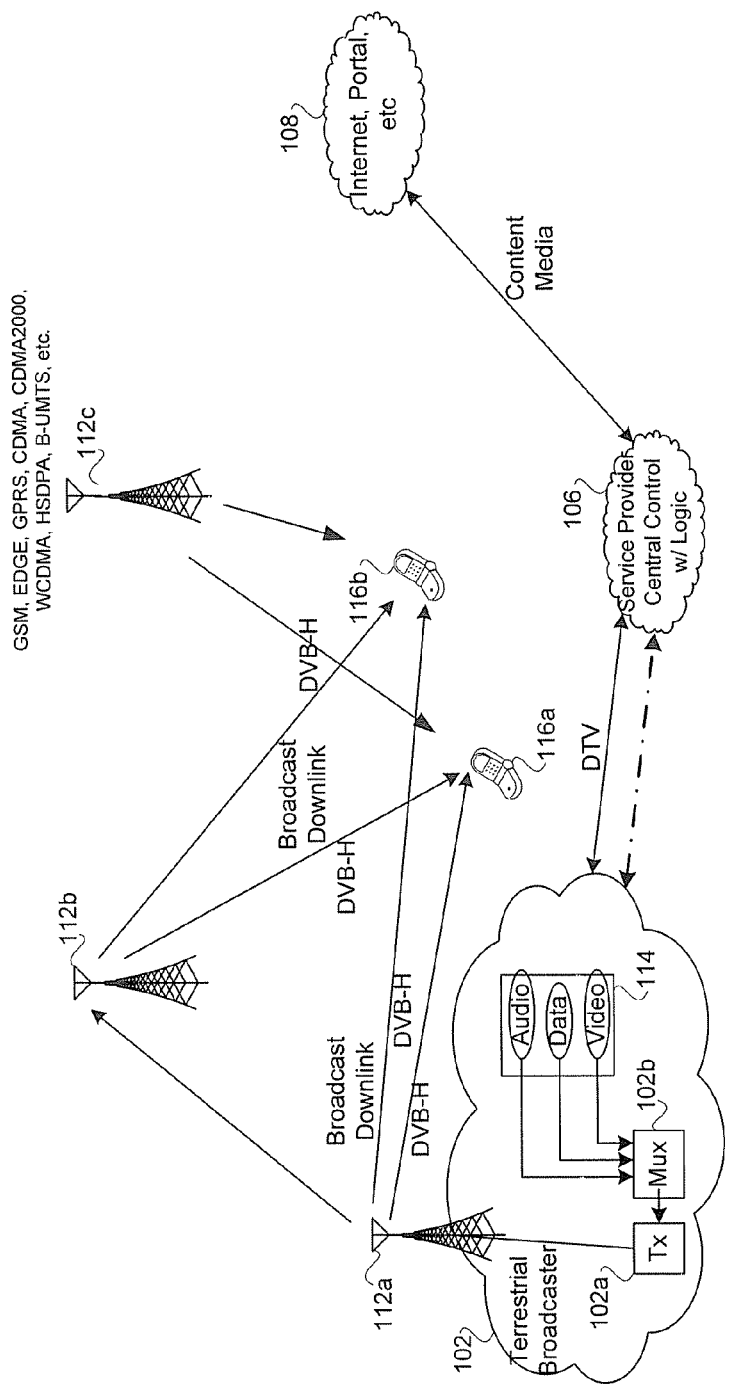
FIG. 1A is a block diagram of an exemplary system for providing integrated services between a cellular network and a digital video broadcast network, in accordance with an embodiment of the invention.

FIG. 1A is a block diagram of an exemplary system for providing integrated services between a cellular network and a digital video broadcast network, in accordance with an embodiment of the invention. Referring to FIG. 1A, there is shown terrestrial broadcaster network 102, service provider 106, portal 108, and mobile terminals (MTs) 116a and 116b. The terrestrial broadcaster network 102 may comprise transmitter (Tx) 102a, multiplexer (Mux) 102b, and information content source 114. The content source 114 may also be referred to as a data carousel, which may comprise audio, data and video content. The terrestrial broadcaster network 102 may also comprise DVB-H broadcast antennas 112a and 112b. The MTs 116a and 116b may also be adapted to communicate within a cellular network via antenna 112c, using one or more of the following communication standards: GSM, EDGE, GPRS, CDMA, CDMA2000, WCDMA, HSDPA, and B-UMTS.

The terrestrial broadcaster network 102 may comprise suitable equipment that may be adapted to encode and/or encrypt data for transmission via the transmitter 102a. The transmitter 102a in the terrestrial broadcaster network 102 may be adapted to utilize DVB-H broadcast channels to communicate information to the mobile terminals 116a, 116b. The multiplexer 102b associated with the terrestrial broadcaster network 102 may be utilized to multiplex data from a plurality of sources. For example, the multiplexer 102b may be adapted to multiplex various types of information such as audio, video and/or data into a single pipe for transmission by the transmitter 102a. Content media from the portal 108, which may be handled by the service provider 106 may also be multiplexed by the multiplexer 102b. The portal 108 may be an ISP service provider.

In one aspect of the invention, the terrestrial broadcaster network 102 may be adapted to provide one or more digital television (DTV) channels to the service provider 106. In this regard, the terrestrial broadcaster network 102 may comprise suitable high-speed or broadband interfaces that may be utilized to facilitate transfer of the DTV channels from the terrestrial broadcast network 102 to the service provider. The service provider 106 may then utilize at least a portion of the DTV channels to provide television (TV) on demand service, or other similar types of services to a wireless service provider network, for example. Accordingly, the service provider 106 may further comprise suitable high-speed or broadband interfaces that may be utilized to facilitate the transfer of related TV on demand information to the wireless service provider network.

Although communication links between the terrestrial broadcast network 102 and the service provider 106 may be wired communication links, the invention may be not so limited. Accordingly, at least one of these communication links may be wireless communication links. In an exemplary embodiment of the invention, at least one of these communication links may be an 802.x based communication link, such as an 802.16 or WiMax broadband access communication link. In another exemplary embodiment of the invention, at least one of these connections may be a broadband line of sight (LOS) connection.

In accordance with an exemplary embodiment of the invention, if the mobile terminal (MT) 116a is within an operating range of the DVB-H broadcasting antenna 112a and moves out of the latter's operating range and into an operating range of the DVB-H broadcasting antenna 112b, then DVB-H broadcasting antenna 112b may be adapted to provide DVB-H broadcast services to the mobile terminal 116a. If the mobile terminal 116a subsequently moves back into the operating range of the DVB-H broadcasting antenna 112a, then the broadcasting antenna 112a may be adapted to provide DVB-H broadcasting service to the mobile terminal 116a. In a somewhat similar manner, if the mobile terminal (MT) 116b is within an operating range of the DVB-H broadcasting antenna 112b and moves out of the latter's operating range and into an operating range of the broadcasting antenna 112a, then the DVB-H broadcasting antenna 112a may be adapted to provide DVB-H broadcasting service to the mobile terminal 116b. If the mobile terminal 116b subsequently moves back into the operating range of broadcasting antenna 112b, then the DVB-H broadcasting antenna 112b may be adapted to provide DVB-H broadcast services to the mobile terminal 116b.

The service provider 106 may comprise suitable interfaces, circuitry, logic and/or code that may be adapted to facilitate communication between the terrestrial broadcasting network 102 and the portal 108. In an illustrative embodiment of the invention the service provider 106 may be adapted to utilize its interfaces to facilitate exchange control information with the terrestrial broadcast network 102 and to exchange control information with the portal 108. The control information exchanged by the service provider 106 with the terrestrial broadcasting network 102 and the portal 108 may be utilized to control certain operations of the mobile terminals, the terrestrial broadcast network 102 and the portal 108. The service provider 106 may also be adapted to handle certain types of service requests, which may have originated from a mobile terminal. For example, the mobile terminal 116a may request that information be delivered to it via a downlink DVB-H broadcast channel. As a result, the service provider 106 may route the requested information from the portal 108 or content service 114 to the mobile terminal 116b. The service provider 106 may also have the capability to send at least a portion of information to be delivered to, for example, mobile terminal 116a via the DVB-H broadcast channel and a remaining portion of the information to be delivered via a cellular broadcast channel.

The portal 108 may comprise suitable logic, circuitry and/or code that may be adapted to provide content media to the service provider 106 via one or more communication links. These communication links, although not shown, may comprise wired and/or wireless communication links. The content media that may be provided by the portal 108 may comprise audio, data, video or any combination thereof. In this regard, the portal 108 may be adapted to provide one or more specialized information services to the service provider 106.

The information content source 114 may comprise a data carousel. In this regard, the information content source 114 may be adapted to provide various information services, which may comprise online data including audio, video and data content. The information content source 114 may also comprise file download, and software download capabilities. In instances where a mobile terminal fails to acquire requested information from the information content source 114 or the requested information is unavailable, then the mobile terminal may acquire the requested information via, for example, a B-UMTS from the portal 108. The request may be initiated through an uplink cellular communication path.

The mobile terminals (MTs) 116a and 116b may comprise suitable logic, circuitry and/or code that may be adapted to handle the processing of uplink and downlink cellular channels for various access technologies and broadcast DVB-H technologies. In an exemplary embodiment of the invention, the mobile terminals 116a, 116b may be adapted to utilize one or more cellular access technologies such as GSM, GPRS, EDGE, CDMA, WCDMA, CDMA2000, HSDPA and MBMS (B-UMTS). The mobile terminal may also be adapted to receive and process DVB-H broadcast signals in the DVB-H bands. For example, a mobile terminal may be adapted to receive and process DVB-H signals. A mobile terminal may be adapted to request information via a first cellular service and in response, receive corresponding information via a DVB-H broadcast service. A mobile terminal may also be adapted to request information from a service provider via a cellular service and in response, receive corresponding information via a data service, which is provided via the cellular service. The mobile terminals may also be adapted to receive DVB-H broadcast information from the DVB-H broadcast antennas 112a and 112b.

In one embodiment of the invention, a mobile terminal may be adapted to utilize a plurality of broadcast integrated circuits for receiving and processing DVB-H channels, and a plurality of cellular integrated circuits for receiving and processing cellular or PCS channels. For broadcast channels, each of the plurality of broadcast integrated circuits may be adapted to handle at least one DVB-H channel.

In another embodiment of the invention, a mobile terminal may be adapted to utilize a single broadcast integrated circuit for receiving and processing DVB-H channels, and a single cellular integrated circuit for receiving and processing cellular or PCS channels. For broadcast channels, the single broadcast integrated circuit may be adapted to handle at least one DVB-H channel. Each of the mobile terminals may comprise a single memory interface that may be adapted to handle processing of the broadcast communication information and processing of cellular communication information.

In yet another embodiment of the invention, a mobile terminal, such as the mobile terminal (MT) 116a, may be adapted to utilize a single integrated circuit for receiving and processing broadcast DVB-H channels, and for receiving and processing cellular or PCS channels. Additionally, the single broadcast and cellular integrated circuit may be adapted to handle different cellular access technologies. For example, the single integrated circuit may comprise a plurality of modules each of which may be adapted to receive and process a particular cellular access technology or a DVB-H broadcast channel. In this regard, the MT 116a may comprise a receive antenna and tuning circuitry adapted to tune the receive antenna when receiving wireless signals, such as DVB-H signals. The tuning circuitry may utilize injection of a reference signal at one or more injection points and generate one or more mixed signals. The tuning circuitry may then tune the receive antenna based on one or more received signal strength indicator (RSSI) values calculated for the one or more mixed signals.

Figure 1B:
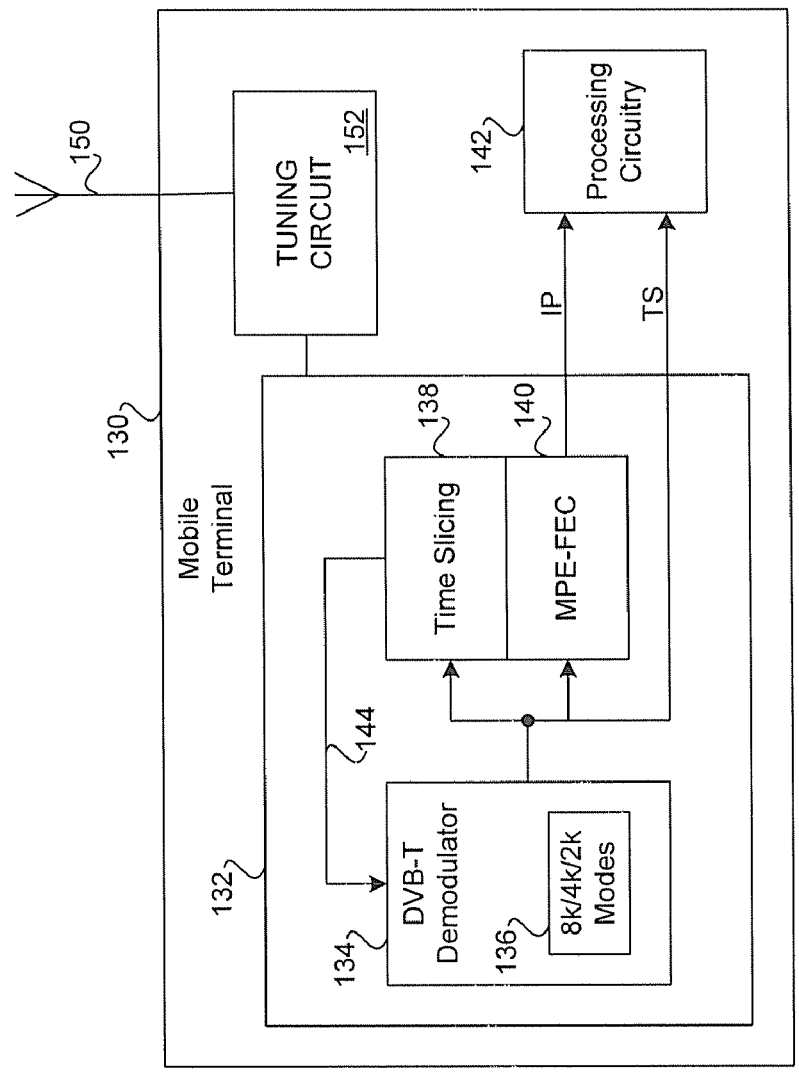
FIG. 1B is a high-level block diagram of exemplary DVB-H receiver circuitry in a mobile terminal, which may be utilized in connection with an embodiment of the invention.

FIG. 1B is a high-level block diagram of exemplary DVB-H receiver circuitry in a mobile terminal, which may be utilized in connection with an embodiment of the invention. Referring to FIG. 1B, there is shown a mobile terminal 130. The mobile terminal 130 may comprise a DVB-H demodulator 132, processing circuitry block 142, antenna 150, and a tuning circuit 152. The DVB-H demodulator block 132 may comprise a DVB-T demodulator 134, time slicing block 138, and multi-protocol encapsulated data—forward error correction (MPE-FEC) block 140.

The DVB-T demodulator 134 may comprise suitable circuitry, logic and/or code that may be adapted to demodulate a terrestrial DVB signal. In this regard, the DVB-T demodulator 134 may be adapted to downconvert a received DVB-T signal to a suitable bit rate that may be handled by the mobile terminal 130. The DVB-T demodulator may be adapted to handle 2k, 4k and/or 8k modes.

The time slicing block 138 may comprise suitable circuitry, logic and/or code that may be adapted to minimize power consumption in the mobile terminal 130, particularly in the DVB-T demodulator 134. In general, time slicing reduces average power consumption in the mobile terminal by sending data in bursts via much higher instantaneous bit rates. In order to inform the DVB-T demodulator 134 when a next burst is going to be sent, a delta indicating the start of the next burst is transmitted within a current burst. During transmission, no data for an elementary stream (ES) is transmitted so as to allow other elementary streams to optimally share the bandwidth. Since the DVB-T demodulator 134 knows when the next burst will be received, the DVB-T demodulator 134 may enter a power saving mode between bursts in order to consume less power. Reference 144 indicates a control mechanism that handles the DVB-T demodulator 134 power via the time slicing block 138. The DVB-T demodulator 134 may also be adapted to utilize time slicing to monitor different transport streams from different channels. For example, the DVB-T demodulator 134 may utilize time slicing to monitor neighboring channels between bursts to optimize handover.

The MPE-FEC block 140 may comprise suitable circuitry, logic and/or code that may be adapted to provide error correction during decoding. On the encoding side, MPE-FEC encoding provides improved carrier to noise ratio (C/N), improved Doppler performance, and improved tolerance to interference resulting from impulse noise. During decoding, the MPE-FEC block 140 may be adapted to determine parity information from previously MPE-FEC encoded datagrams. As a result, during decoding, the MPE-FEC block 140 may generate datagrams that are error-free even in instances when received channel conditions are poor. The processing circuitry block 142 may comprise suitable processor, circuitry, logic and/or code that may be adapted to process IP datagrams generated from an output of the MPE-FEC block 140. The processing circuitry block 142 may also be adapted to process transport stream packets from the DVB-T demodulator 134.

The tuning circuit 152 may comprise suitable circuitry, logic, and/or code and may be adapted to tune the antenna 150 utilizing injection of a reference signal. In this regard, the tuning circuit may inject one or more received DVB-H signals with a reference frequency signal to generate a mixed signal. The tuning circuit may then determine a RSSI value for the mixed signal and may tune the antenna 150 based on the determined RSSI value. In another embodiment of the invention, when the MT receives FM, Bluetooth and/or WLAN signals, for example, the tuning circuit 152 may tune the antenna 150 by hopping to a plurality of received packets and determining a plurality of RSSI values associated with the received packets.

In operation, the MT 130 may receive a wireless signal, such as a DVB-H signal, a Bluetooth signal, an FM signal, and/or a WLAN signal. The received signal may be communicated to the tuning circuit 152 and the tuning circuit 152 may tune the antenna 150, thereby increasing received signal processing efficiency. After the antenna 150 is tuned by the tuning circuit 152, the received signal may be communicated to the DVB-T demodulator 134. The DVB-T demodulator 134 may be adapted to receive an input DVB-T RF signal, demodulate the received input DVB-T RF signal so as to generate data at a much lower bit rate. In this regard, the DVB-T demodulator 134 recovers MPEG-2 transport stream (TS) packets from the input DVB-T RF signal. The MPE-FEC block 140 may then correct any error that may be located in the data and the resulting IP datagrams may be sent to the processing circuitry block 142 for processing. Transport stream packets from the DVB-T demodulator 134 may also be communicated to the processing circuitry block 142 for processing.

Figure 2:
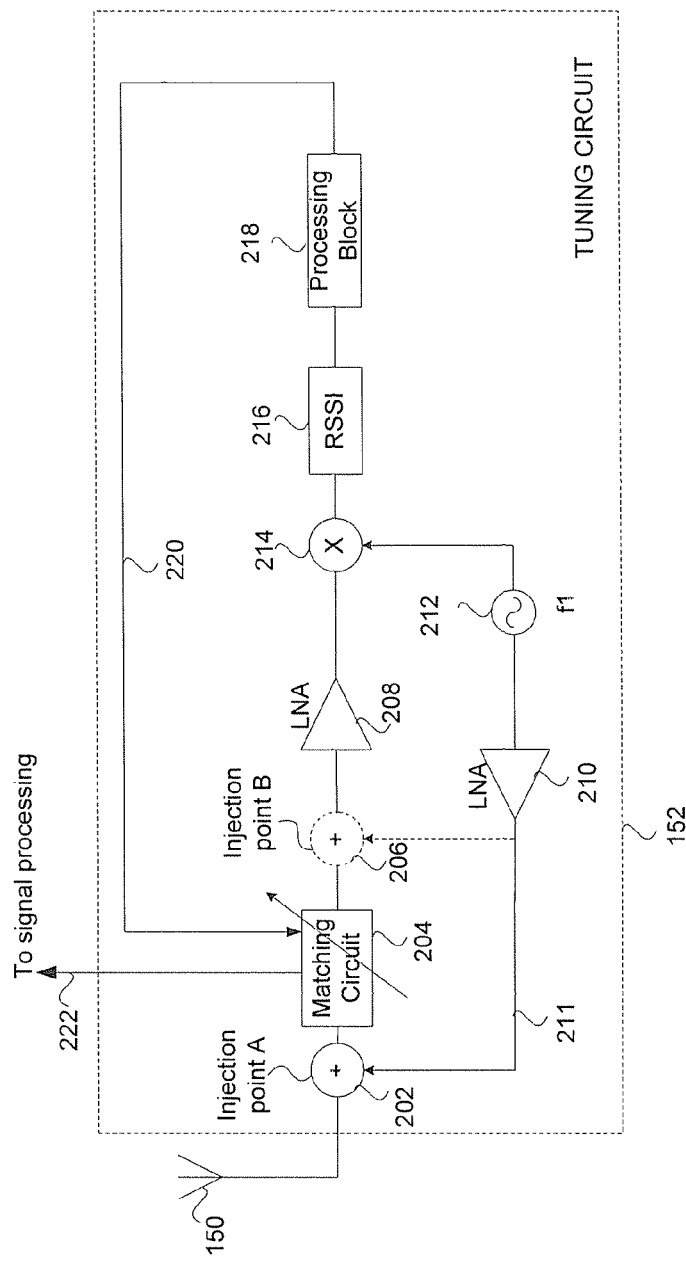
FIG. 2 is a block diagram of an exemplary circuit for tuning a receive antenna using injection, in accordance with an embodiment of the invention.

FIG. 2 is a block diagram of an exemplary circuit for tuning a receive antenna using injection, in accordance with an embodiment of the invention. Referring to FIG. 2, there is illustrated the antenna 150 and the tuning circuit 152 of FIG. 1B. The tuning circuit 152 may comprise an adder 202, low noise amplifiers (LNAs) 210 and 208, a multiplier 214, a RSSI block 216, a matching circuit 204, a processing block 218, and a voltage controlled oscillator (VCO) 212.

The matching circuit 204 may comprise suitable circuitry, logic and/or code and may be adapted to tune the antenna 150. For example, the matching circuit 204 may comprise one or more L-C chains and may utilize RSSI information to tune the antenna 150. In an exemplary embodiment of the invention, the matching circuit may comprise a variable matching circuit, which may enable manual tuning of the antenna 150.

The RSSI block 216 may comprise suitable circuitry, logic and/or code and may enable calculation of one or more RSSI values based on an input signal received from the multiplier 214. The processing block 218 may comprise suitable circuitry, logic and/or code and may enable storing of a plurality of RSSI values received from the RSSI block 216, which may be associated with a plurality of signals received via the antenna 150. The processing block 218 may also determine a maximum RSSI value from the plurality of RSSI values received from the RSSI block 216. The VCO 212 may comprise suitable circuitry, logic and/or code and may generate a reference signal f1. The generated reference signal f1 may be communicated to the LNA 210 and/or to the multiplier 214.

In operation, the antenna 150 may receive a wireless signal, such as a DVB-H signal. The received signal may be communicated to the adder 202 within the tuning circuit 152 for processing. The VCO 212 may generate the reference signal f1 and may communicate the generated signal f1 to the LNA 210. The amplified reference signal 211 may then be communicated to the adder 202, which may be located at injection point A. The adder 202 may inject the received DVB-H signal with the amplified low frequency signal 211 to generate an added signal. The added signal generated at injection point A may then be communicated to the LNA 208. The LNA 208 may amplify the added signal and may communicate the amplified added signal to the multiplier 214. Even though injection point A is located before the matching circuit 204, the present invention may not be so limited. In an exemplary embodiment of the invention, the amplified reference signal f1 may be injected to the received DVB-H signal at an injection point B, using the adder 206.

The multiplier 214 may perform a conversion to DC level by multiplying the amplified added signal received from the LNA 208 by the reference signal f1 generated by the VCO 212. In this regard, the multiplier 214 may generate a mixed signal which may be at a DC level. The generated mixed signal may be communicated to the RSSI block 216. The RSSI block 216 may then measure the signal envelope, or signal power of the mixed signal and may determine an RSSI value associated with the mixed signal and the corresponding received wireless signal. The conversion to DC level of the mixed signal may facilitate measuring the power envelope of the mixed signal by the RSSI block 216. The generated RSSI value may be communicated from the RSSI block 216 to the processing block 218.

The processing block may store the received RSSI value associated with the received DVB-H signal. After an RSSI value is determined for the received wireless signal, the tuning circuit 152 may determine one or more additional RSSI values for one or more subsequent received signal. In this regard, the RSSI values may be determined by hopping from a first received packet to a second packet to a third packet, and so on. The processing block may store the additional RSSI values associated with the subsequent received signals and may then determine a maximum RSSI value. The maximum determined RSSI value 220 may be communicated back to the matching circuit 204. The matching circuit 204 may tune the antenna based on tuning settings associated with the received signal corresponding to the maximum RSSI value 220. In an exemplary embodiment of the invention, the processing block 218 may communicate the maximum determined RSSI value as well as processing information, such as tuning information, related to the received wireless signal corresponding to the maximum determined RSSI value. The matching circuit 204 may then tune the antenna 150 based on the tuning information related to the received wireless signal corresponding to the maximum determined RSSI value. After the antenna 150 is tuned, a wireless signal 222 may be received via the tuned antenna 150 and may be communicated for further processing.

In an exemplary embodiment of the invention, the antenna 150 may communicate a plurality of received packets to the tuning circuit 152 and tuning of the antenna 150 may be based on RSSI values associated with the plurality of received packets. In another embodiment of the invention, the antenna 150 may communicate a plurality of received packet preambles to the tuning circuit 152 and tuning of the antenna 150 may be based on RSSI values associated with the plurality of received packet preambles.

In another exemplary embodiment of the invention, the calibration of antenna 150 using RSSI calculation may be performed during a time that no packet is received, by using the reference signal f1. In instances when no packet is received, the reference signal f1 may be generated by the VCO 212 or by a phase locked loop (PLL), or another VCO, used by one or more other processing circuits within the handheld 130.

Figure 3:
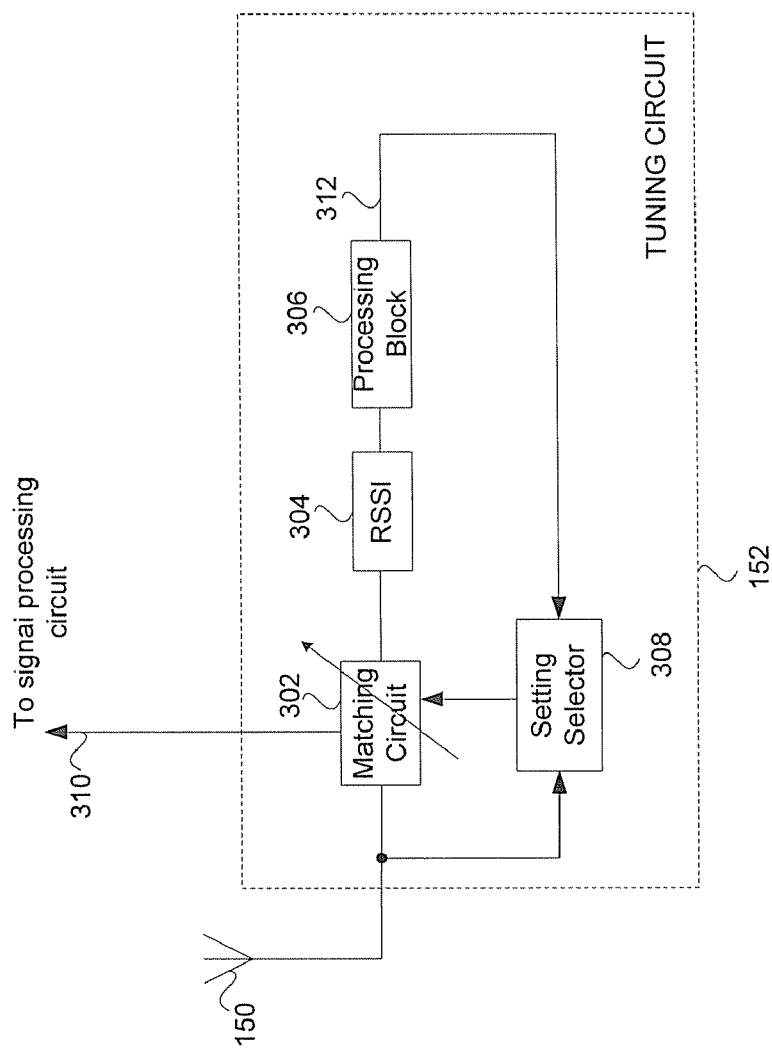
FIG. 3 is a block diagram of an exemplary circuit for tuning a receive antenna using packet hopping, in accordance with an embodiment of the invention.

FIG. 3 is a block diagram of an exemplary circuit for tuning a receive antenna using packet hopping, in accordance with an embodiment of the invention. Referring to FIG. 3, there is illustrated an antenna 150 and a tuning circuit 152. The tuning circuit 152 may comprise a matching circuit 302, a setting selector block 308, a RSSI block, and a processing block 306. The matching circuit 302, the RSSI block 304 and the processing block 306 may have functionalities that are similar to the matching circuit 204, the RSSI block 216 and the processing block 218 of FIG. 2, respectively. The setting selector block 308 may comprise suitable circuitry, logic and/or code and may provide one or more pre-determined tuning settings to the matching circuit 302.

In instances where the packets received by antenna 150 are very short, such as, for example, Bluetooth (BT) packets, FM packets, and/or WLAN packets, a plurality of RSSI values may be determined by the tuning circuit 152 for a plurality of received packets based on pre-determined antenna settings. A maximum RSSI may then be selected from the plurality of determined RSSI values based on the pre-determined antenna settings for the plurality of received FM/BT/WLAN packets. The antenna 150 may be tuned based on the pre-determined antenna setting corresponding to the maximum RSSI value.

In operation, the antenna 150 may receive a wireless signal, such as a BT, FM or WLAN signal packet. The setting selector block 308 may provide a first pre-determined tuning setting to the matching circuit 302. The matching circuit 302 may tune the antenna 150 using the pre-determined setting. The received signal may be communicated to the RSSI block 304 and the RSSI block 304 may measure the signal envelope, or signal power of the received signal packet, as received by the antenna 150 using the first pre-determined antenna setting. The resulting RSSI value may be communicated and stored by the processing block 306.

The antenna 150 may then receive a second packet using a second pre-determined tuning setting communicated by the setting selector block 308 to the matching circuit 302. The RSSI block 304 may calculate a second RSSI value corresponding to the second received signal packet. In this regard, the RSSI block 304 may calculate a plurality of RSSI values for the plurality of received BT/FM/WLAN packets. The processing block 306 may determine a maximum RSSI value from the plurality of determined RSSI values and may communicate the maximum RSSI value 312 to the setting selector block 308. The setting selector block may communicate the pre-determined antenna tuning setting, corresponding to the maximum RSSI value 312, to the matching circuit 302. The matching circuit 302 may then tune the antenna 150 based on the tuning information received from the setting selector block 308. After the antenna 150 is tuned, a wireless signal 310 may be received via the tuned antenna 150 and may be communicated for further processing.

Figure 4:
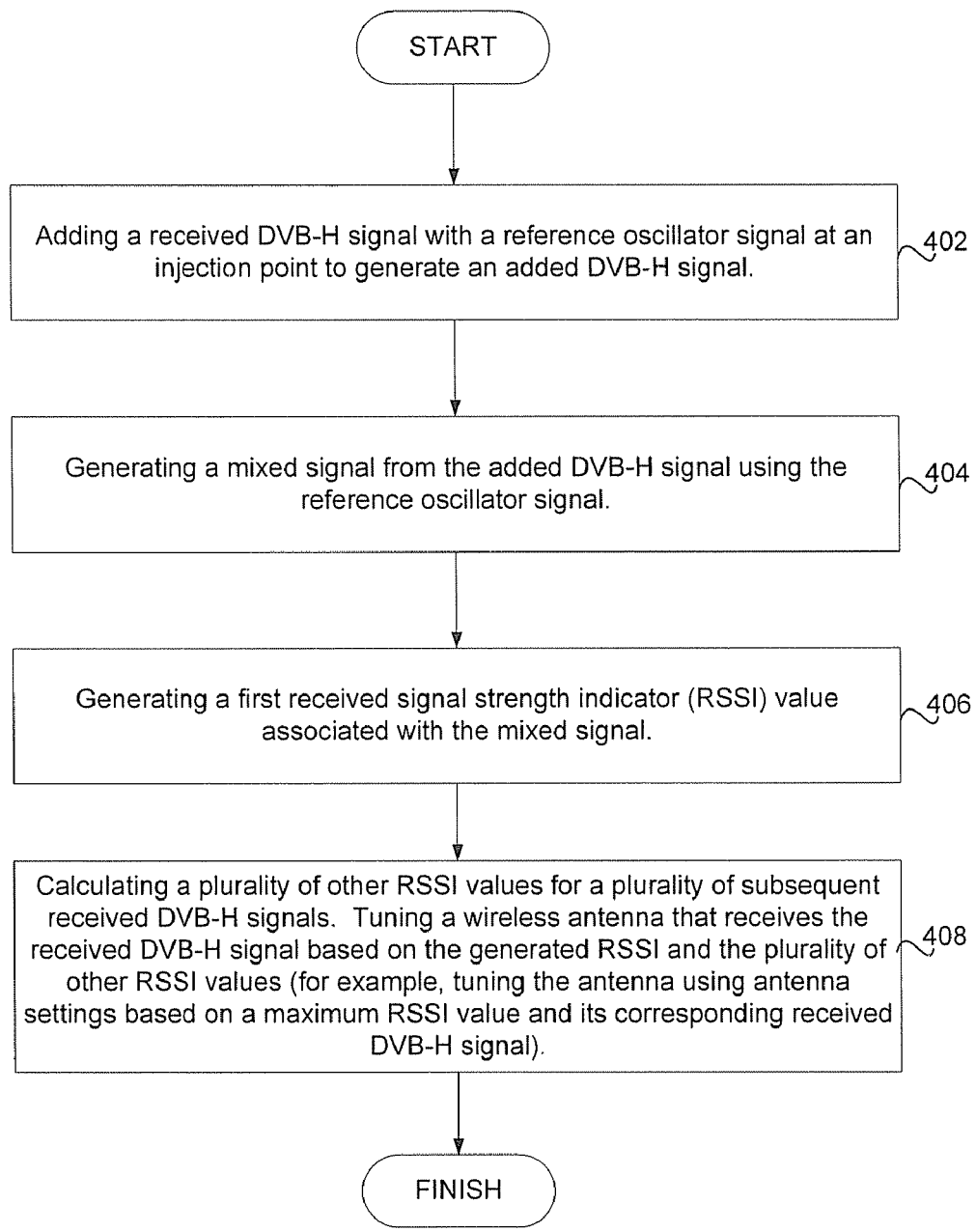
FIG. 4 is a flow diagram illustrating exemplary steps for tuning a receive antenna using injection, in accordance with an embodiment of the invention.

FIG. 4 is a flow diagram illustrating exemplary steps for tuning a receive antenna using an injection, in accordance with an embodiment of the invention. Referring to FIGS. 2 and 4, at 402, a DVB-H signal received via antenna 150 may be added with a reference signal f1 at an injection point A to generate an added DVB-H signal. At 404, a mixed signal may be generated by the multiplier 214 from the added DVB-H signal using the reference signal f1 communicated by the VCO 212. At 406, the RSSI block 216 may generate a first RSSI value associated with the mixed signal. At 408, the RSSI block 218 may calculate a plurality of other RSSI values for a plurality of subsequent received DVB-H signals. The matching circuit 204 may tune the antenna 150 based on the generated RSSI value and the plurality of other RSSI values. For example, the antenna 150 may be tuned using antenna settings based on a maximum RSSI value and its corresponding received DVB-H signal.

Figure 5:
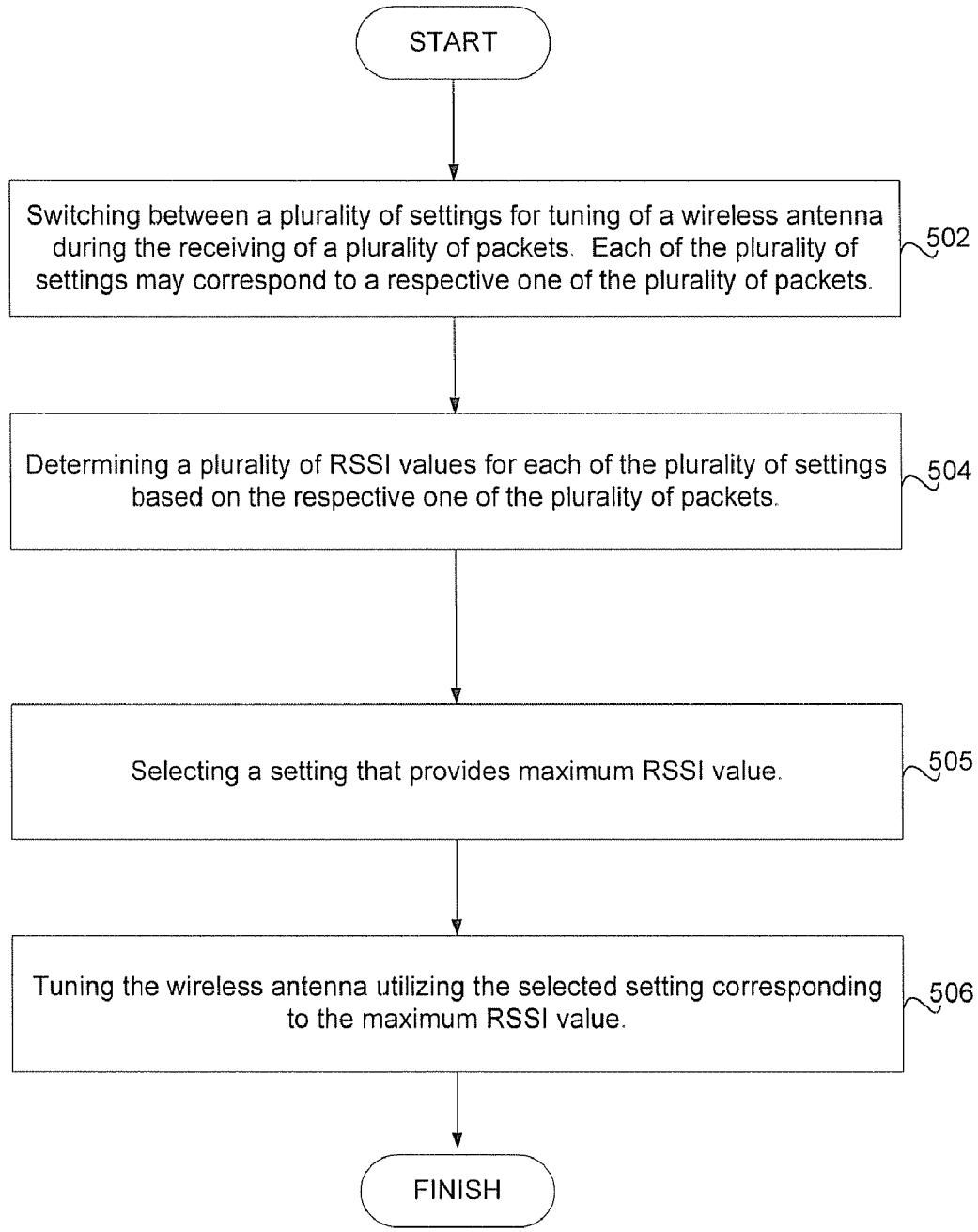
FIG. 5 is a flow diagram illustrating exemplary steps for tuning a receive antenna using packet hopping, in accordance with an embodiment of the invention.

FIG. 5 is a flow diagram illustrating exemplary steps for tuning a receive antenna using packet hopping, in accordance with an embodiment of the invention. Referring to FIGS. 3 and 5, at 502, the tuning circuit 152 may switch between a plurality of settings for tuning of the wireless antenna 150 during the receiving of a plurality of packets. The setting selector block 308 may provide the matching circuit 302 with a plurality of antenna tuning settings. Each of the plurality of antenna tuning settings may correspond to a respective one of the plurality of received packets. At 504, the RSSI block 304 may determine a plurality of RSSI values for each of the plurality of settings, based on the respective one of the plurality of packets. At 505, the setting selector 308 may select a setting that provides maximum RSSI value. At 506, the wireless antenna 150 may be tuned utilizing the selected setting corresponding to the maximum RSSI value.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:

adding a received DVB-H signal with a reference oscillator signal to generate an added DVB-H signal, wherein said reference oscillator signal is added at an output of a matching load;

generating a mixed signal from said added DVB-H signal using said reference oscillator signal; and tuning, using said matching load, a wireless antenna that receives said received DVB-H signal based on a received signal strength indicator (RSSI) associated with said mixed signal.

2. The method according to claim 1, comprising generating said reference oscillator signal.

3. The method according to claim 2, comprising amplifying said generated reference oscillator signal.

4. The method according to claim 1, comprising amplifying said added DVB-H signal prior to said generating of said mixed signal.

5. The method according to claim 1, comprising determining said RSSI associated with said mixed signal.

6. The method according to claim 1, wherein said tuning occurs during receiving of a preamble of a packet for said received DVB-H signal.

7. The method according to claim 1, wherein said tuning occurs during receiving of a plurality of packets for said received DVB-H signal.

8. The method according to claim 7, comprising switching between a plurality of settings for said tuning of said wireless antenna during said receiving of said plurality of packets.

9. The method according to claim 8, wherein each of said plurality of settings corresponds to a respective one of said plurality of packets.

10. The method according to claim 9, comprising determining a plurality of RSSI values for each of said plurality of settings based on said respective one of said plurality of packets.

11. The method according to claim 10, comprising tuning said wireless antenna utilizing at least one of said plurality of settings corresponding to a maximum one of said determined plurality of RSSI values.

12. A system for wireless communication, the system comprising:

at least one circuit, within a digital video broadcast (DVB-H) receiver comprising a receive wireless antenna, said at least one circuit enables adding of a received DVB-H signal with a reference oscillator signal to generate an added DVB-H signal, wherein said reference oscillator signal is added at an output of a matching load;

said at least one circuit enables generation of a mixed signal from said added DVB-H signal using said reference oscillator signal; and said at least one circuit enables tuning of said receive wireless antenna, using said matching load, based on a received signal strength indicator (RSSI) associated with said mixed signal.

13. The system according to claim 12, wherein said at least one circuit enables generation of said reference oscillator signal.

14. The system according to claim 13, wherein said at least one circuit enables amplifying of said generated reference oscillator signal.

15. The system according to claim 12, wherein said at least one circuit enables amplifying of said added DVB-H signal prior to said generating of said mixed signal.

16. The system according to claim 12, wherein said at least one circuit enables determining of said RSSI associated with said mixed signal.

17. The system according to claim 12, wherein said tuning occurs during receiving of a preamble of a packet for said received DVB-H signal.

18. The system according to claim 12, wherein said tuning occurs during receiving of a plurality of packets for said received DVB-H signal.

19. The system according to claim 18, wherein said at least one circuit enables switching between a plurality of settings for said tuning of said wireless antenna during said receiving of said plurality of packets.

20. The system according to claim 19, wherein each of said plurality of settings corresponds to a respective one of said plurality of packets.

21. The system according to claim 20, wherein said at least one circuit enables determining of a plurality of RSSI values for each of said plurality of settings based on said respective one of said plurality of packets.

22. The system according to claim 21, wherein said at least one circuit enables tuning of said wireless antenna utilizing at least one of said plurality of settings corresponding to a maximum one of said determined plurality of RSSI values.

* * * * *